United States Patent [19]
Merkle et al.

[11] 3,953,751
[45] Apr. 27, 1976

[54] MOTOR AND MOUNTING THEREOF
[75] Inventors: Alfred Merkle, St. Georgen; Fritz Schmieder, Hornberg; Werner Heinzmann, St. Georgen, all of Germany
[73] Assignee: Papst Motoren KG, St. Georgen im Schwarzwald, Germany
[22] Filed: Oct. 11, 1974
[21] Appl. No.: 514,282

Related U.S. Application Data
[62] Division of Ser. No. 285,520, Aug. 31, 1972, Pat. No. 3,845,339.

[30] Foreign Application Priority Data
Sept. 1, 1971  Germany............................ 2143752

[52] U.S. Cl............................. 310/91; 310/156; 310/268
[51] Int. Cl.² ........................................ H02K 5/04
[58] Field of Search.......... 310/114, 156, 268, 68 R, 310/68 C, 68 D, 68 B, 112, 89, 91

[56] References Cited
UNITED STATES PATENTS

| | | | |
|---|---|---|---|
| 271,928 | 2/1883 | Seeley................................ | 310/268 |
| 2,428,781 | 10/1947 | Bowlus............................... | 310/268 |
| 3,215,876 | 11/1965 | Nichols et al..................... | 310/268 X |
| 3,280,353 | 10/1966 | Haydon et al. ................. | 310/268 X |
| 3,324,321 | 6/1967 | Kober............................... | 310/268 X |
| 3,348,086 | 10/1967 | Monma.............................. | 310/268 |
| 3,482,131 | 12/1969 | Lytle.................................. | 310/156 |

FOREIGN PATENTS OR APPLICATIONS
1,563,418    5/1970    Germany

Primary Examiner—Donovan F. Duggan
Attorney, Agent, or Firm—Michael J. Striker

[57]     ABSTRACT

There is provided a support structure for a motor. The motor includes a stator and a rotor. The Stator is comprised of a generally plate-shaped winding arrangement including a generally plate-shaped winding support arrangement connected to and supported by the support structure. The winding arrangement further includes a plurality of windings supported on the generally plate-shaped winding support arrangement. The stator further comprises a central support portion supported by the plate-shaped winding support arrangement. The rotor comprises a rotor shaft supported on the central support portion and extending transversely to the generally plate-shaped winding arrangement. The rotor further includes permanently magnetized material and magnetic return structure mounted on the rotor shaft for rotation therewith. Preferably, the motor is supported exclusively by the support structure, with the support structure being connected exclusively to the generally plate-shaped winding support arrangement of the motor.

12 Claims, 2 Drawing Figures

U.S. Patent   April 27, 1976   3,953,751
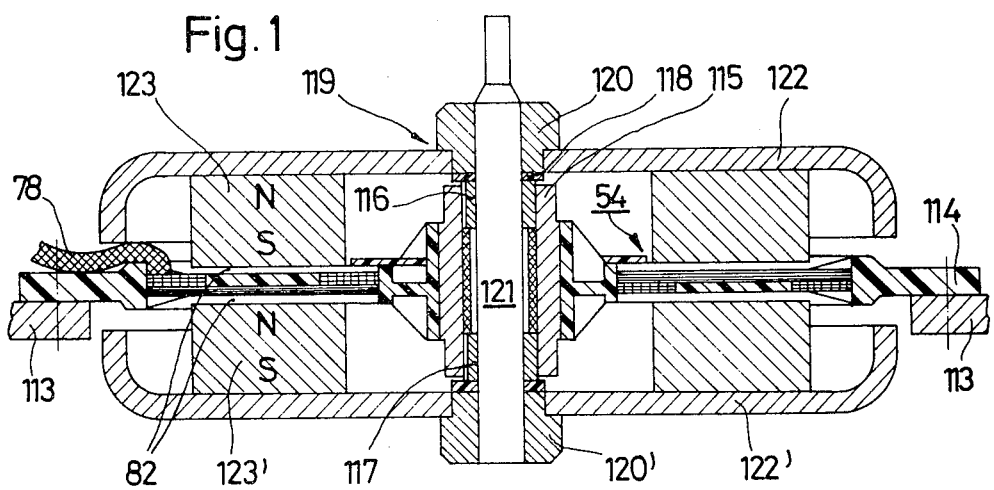
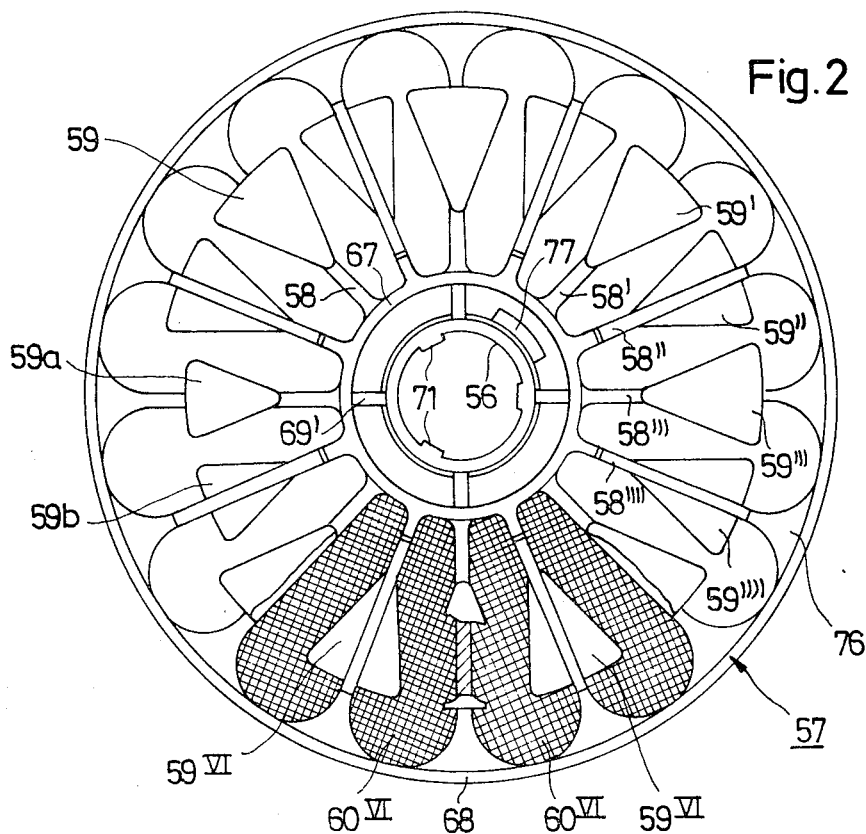

MOTOR AND MOUNTING THEREOF

CROSS-REFERENCE TO RELATED APPLICATION

The present application is a division of our copending application Ser. No. 285,520, now U.S. Pat. No. 3,845,339 filed Aug. 31, 1972, entitled "ELECTRIC MOTOR."

BACKGROUND OF THE INVENTION

For many purposes motors are required having a small axial length and a large moment of inertia. This applies for example to record players, tape records and the like.

German patent specification No. 589,788 discloses an electric motor of this kind in which the winding, which has the appearance of a disk, is attached to the turntable of a record player and rotates with it, the iron of the turntable serving at the same time as part of the magnetic circuit. As a result of the relatively small mass of the winding, the rotor of such a motor possesses only a relatively small moment of inertia, and the bearing arrangement poses difficulties. In addition, the armature winding must be supplied with current by means of a collector. Furthermore, the manner in which the motor is mounted is not such as to inherently reduce the axial length of the motor, or expressed otherwise, is not inherently such as to reduce the space consumed by the mounted motor and the mounting means therefor, as considered in direction parallel to the rotation axis of the rotor of the motor.

SUMMARY OF THE INVENTION

It is a general object of the invention to overcome the disadvantages of motors of this type.

More particularly it is an object of the invention to provide a motor with a rotor having a larger moment of inertia.

Importantly, it is an object of the invention to so design the motor that it can be mounted in a manner which inherently consumes less space than similar prior-art motors, as considered in the axial direction.

These objects, and others which will become more understandable from the description, below, of a preferred embodiment, can be met, according to one advantageous concept of the invention, by providing, in combination, a support structure for a motor, and a motor comprised of a stator and a rotor. The stator comprises a generally plate-shaped winding arrangement comprised of a generally plate-shaped winding support arrangement connected to and supported by the support structure for the motor, with a plurality of windings being supported on the generally plate-shaped winding support arrangement. The stator further comprises a central support portion supported by the plate-shaped winding support arrangement. The rotor includes a rotor shaft which is supported on the central support portion of the stator and which extends transversely to the generally plate-shaped winding arrangement The rotor further includes permanent magnet means and magnetic return structure mounted on the rotor shaft for rotation therewith.

The novel features which are considered as characteristic for the invention are set forth in particular in the appended claims. The invention itself, however, both as to its construction and its method of operation, together with additional objects and advantages therof, will be best understood from the following description of specific embodiments when read in connection with the accompanying drawing.

BRIEF DESCRIPTION OF THE DRAWING

FIG. 1 is an axial section through one motor according to the invention mounted in one manner according to the invention; and FIG. 2 is a view of a part of the stator of the motor depicted in FIG. 1.

DESCRIPTION OF THE PREFERRED EMBODIMENTS

One preferred embodiment of the inventive motor and motor mounting expedient is depicted in FIGS. 1 and 2. FIG. 1 is an axial section through the motor showing how the motor is supported, whereas FIG. 2 depicts the generally plate-shaped winding arrangement of the motor. Additional details regarding the construction of the plate-shaped winding arrangement can be had by resorting to our above-identified opening application No. 285,520, the entire disclosure of which is incorporated herein by reference.

The motor shown in FIG. 1 is particularly adapted to be mounted in the opening of a plate 113, or the like. The stator portion 54 will be described below with reference to FIG. 2. It will be noted, however, that the generally plate-shaped winding support arrangement has a radially outwardly extending flange-like extension 114 which can be joined to the plate 113 for purposes of mounting. It will be clear from FIG. 1 that the motor located in the opening in plate 113 is supported exclusively by the rim of the opening in plate 113. Furthermore, it will be clear from FIG. 1 that the rim of the plate 113 is connected to the motor only at the flange-like portion 114 of the generally plate-shaped winding support arrangement (shown in more detain in FIG. 2) Finally, it will be apparent from FIG. 1 that, since the motor is supported exclusively by the plate 113, and since the plate 113 is connected to the plate-shaped winding carrier, all the other components of the motor derive their support from the plate-shaped winding carrier.

More specifically, the motor shown in FIG. is comprised of a hollow cylindrical supporting member 115 with two sintered bearings 116, 117 secured to the inner periphery of the support arrangement for the windings. At the upper side of member 115 is located a plastic ring 118 which serves as an axial bearing and which cooperates with the sintered bearing 116. Such a combination can of course be replaced by embedding these members in ball bearings.

The rotor of the motor is generally designated by the numeral 119 and is composed of two generally cup-shaped parts 122 and 122' which face each other and which are connected by way of bushings 120 and 120'. These bushings are connected to shaft 121, the shaft being mounted in the bearings 116, 117. Mounted on each of these parts 122 and 122' is a magnetic ring 123, 123' the arrangement being such that, as shown in FIG. 1, unlike poles face each other. This arrangement results in a particularly homogeneous field in the air gap 82 and consequently in a high torque. It will be understood that each of the magnetic rings 123, 123' is comprised of circumferentially successive sections of successively opposite polarity. When a rotating field is generated by excitation of the windings of the stator 54, the rotor 119 will rotate so as to follow such field.

The winding arrangement of the stator of the motor as indicated in FIG. 1 to lie axially intermediate magnetic rings 123, 123'. Details of the construction of the winding arrangement of the stator will be particularly evident from FIG. 2. FIG. 2 shows a generally plate-shaped support arrangement for the stator windings, the support arrangement having the general appearance of a wagon wheel. The windings have been removed for the sake of clarity, except that two windings are schematically indicated near the bottom of the Figure. The support arrangement illustrated in FIG. 2 is advantageously made of injection-molded plastic having an amorphous structure, for instance "Trogamid" (manufactured by the Dynamit-Nobel Company of Sweden). It is important that the support arrangement illustrated have excellent shape retaining characteristics. The generally plate-shaped support arrangement has an outer ring or rim 68 and an inner ring or rim 67. Inner ring 67 has four radially extending supporting webs 69'. A plurality of spoke-like members 58 extend in radial direction of the carrier arrangement. Half of the members 58 lie in a first plane located at one axial side of the carrier wheel, while the other half of the members 58 lie in a second plane located at the other axial side of the carrier wheel. Ribs 58' and 58'''' lie in one plane whereas ribs 58'' and 58''''' lie in another plane. Each radial rib 58 is cast integral with a triangular widened portion 59. The portion 59 associated with each rib 58 lies in the plane not of the respective rib, but rather in the plane of the adjoining ribs. These widened areas are indicated as 59' to 59'''' in FIGS. 2. The outer periphery of each triangular part 59 engages the complimentary inner periphery of one respective winding. Thus, each winding will be centered about a respective triangular member 59 and derives support from the backs of two adjoining members 59. In FIG. 2, for example, one generally triangular winding will be centered about triangular part 59''' and will lie in the general plane of the triangular member. Each of the windings 60 actually includes two wires wound together, this being done without coil forms and with what are known as back-lackered wires, the varnishing of which becomes adhesive on being heated with the result that after being wound the windings 60 form rigid units. The two windings in one of the aforementioned planes are wound continuously, that is, all the windings carried by the illustrated support arrangement are formed from only four distinct wires, the windings of two wires lying in one of the planes and the windings of the other two wires lying in the other of the planes. Thus, there are four separately energizable windings arrangements.

All the windings 60 are adhered onto the support arrangement 57 to form with the latter a stable, rigid and self-supporting arrangement which would also be suitable for a rotating armature. The coils 60 of the lower plane are two wired and continuously wound like the coils of the upper plane.

The web-like ribs 58 are each secured with their inner ends to a continuous ring 67 and with their outer ends to a continuous ring 68. The inner ring 67 is joined by radial webs 69' and the connecting web 69 to a retaining ring 118 provided with three longitudinal ribs.

It will be noted that in FIG. 2 of the drawing, the radially outwardly extending flange-like portion 114 shown in FIG. 1 is not depicted; however it will be understood to be present. Additional details concerning the configuration of the generally plate-shaped winding arrangement shown in FIG. 2 are set forth in our previously mentioned copending application, the entire disclosure of which is incorporated herein by reference.

It will be understood that each of the elements described above, or two or more together, may also find a useful application in other types of constructions and mounting expedients differing from the types described above.

While the invention has been illustrated and described as embodied in a collectorless D.C. motor mounted in the central opening of a support plate, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended:

1. In combination, a support structure for a motor; a motor comprising a stator and a rotor, said stator comprising a generally plate-shaped winding arrangement comprised of a generally plate-shaped winding support arrangement connected to and supported by said support structure for said motor, and said winding arrangement further including a plurality of windings supported on said generally plate-shaped winding support arrangement, said stator further comprising a central support portion supported by said plate-shaped winding support arrangement, and said rotor comprising a rotor shaft supported on said central support portion and extending transversely to said generally plate-shaped winding arrangement, said rotor further comprising permanent magnet means and a magnetic return structure mounted on said rotor shaft for rotation therewith.

2. The combination defined in claim 1, wherein said motor is supported exclusively by said support structure, and wherein said support structure is connected exclusively to said winding support arrangement of said motor.

3. The combination defined in claim 1, wherein said magnetic return structure is comprised of first and second parts respectively located at opposite axial sides of said generally plate-shaped winding arrangement and axially spaced from the latter, and wherein said permanent magnet means comprises an annular permanent magnet arrangement located intermediate said first part of said magnetic return structure and said generally plate-shaped winding arrangement and defining with the latter an axial air gap.

4. The combination defined in claim 3, wherein said annular permanent magnet arrangement constitutes a first annular permanent magnet arrangement, and wherein said axial air gap constitutes a first axial air gap, and wherein said permanent magnet means further includes a second annular permanent magnet arrangement located intermediate said second part of said magnetic return structure and said generally plate-shaped winding arrangement and defining with the latter a respective second axial air gap.

5. The combination defined in claim 2, wherein said magnetic return structure is comprised of first and second parts respectively located at opposite axial sides of said generally plate-shaped winding arrangement and axially spaced from the latter, and wherein said permanent magnet means comprises an annular permanent magnet arrangement located intermediate said first part of said magnetic return structure and said generally plate-shaped winding arrangement and defining with the latter an axial air gap.

6. The combination defined in claim 5, wherein said annular permanent magnet arrangement constitutes a first annular permanent arrangement, and wherein said axial air gap constitutes a first axial air gap, and wherein said permanent magnet means further includes a second annular permanent magnet arrangement located intermediate said second part of said magnetic return structure and said generally plate-shaped winding arrangement and defining with the latter a respective second axial air gap.

7. The combination defined in claim 1, wherein said rotor shaft defines a rotor rotation axis, and wherein said plurality of windings are arranged in a ring around said axis.

8. The combination defined in claim 7, wherein said generally plate-shaped winding support arrangement is made of non-magnetic material and wherein said plurality of windings constitute coreless coils.

9. The combination defined in claim 8, wherein said generally plate-shaped winding support arrangement is comprised of an inner peripheral portion connected to and supporting said central support portion, and a plurality of radially extending ribs connected together at their radially innermost ends and at their radially outermost ends and holding said windings in position on said generally plate-shaped winding support arrangement.

10. The combination defined in claim 9, wherein said plurality of windings include a first plurality of windings located at one axial side of said generally plate-shaped winding support arrangement in a first general plane and a second plurality of windings located at the other axial side of said generally plate-shaped winding support arrangement in a second general plane, said first and said second plurality of windings being each arranged in a ring around said axis, and wherein said ribs have widened portions each serving to engage the inner periphery of a respective one of said windings.

11. The combination defined in claim 1, wherein said magnetic return structure is comprised of first and second cup-shaped parts located on opposite axial sides of said generally plate-shaped winding arrangement, with said permanent magnet means being located intermediate said generally plate-shaped winding arrangement and at least one of said cup-shaped parts and defining with said generally plate-shaped winding arrangement at least one axial air gap, and wherein said generally plate-shaped winding support arrangement extends radially outwardly beyond said rotor.

12. The combination defined in claim 1, wherein said generally plate-shaped winding support arrangement extends radially outwardly beyond said rotor.

* * * * *